US010430522B2

(12) United States Patent
Alshikh et al.

(10) Patent No.: US 10,430,522 B2
(45) Date of Patent: Oct. 1, 2019

(54) DYNAMIC SUGGESTIONS FOR CONTENT TRANSLATION

(71) Applicant: Qordoba, Inc., San Francisco, CA (US)

(72) Inventors: Waseem Alshikh, San Francisco, CA (US); May Habib, San Francisco, CA (US)

(73) Assignee: Qordoba, Inc., San Francisco, CA (US)

(*) Notice: Subject to any disclaimer, the term of this patent is extended or adjusted under 35 U.S.C. 154(b) by 0 days.

(21) Appl. No.: 15/458,939

(22) Filed: Mar. 14, 2017

(65) Prior Publication Data

US 2017/0270104 A1    Sep. 21, 2017

Related U.S. Application Data

(60) Provisional application No. 62/308,681, filed on Mar. 15, 2016.

(51) Int. Cl.
*G06F 17/28* (2006.01)

(52) U.S. Cl.
CPC ........ *G06F 17/289* (2013.01); *G06F 17/2854* (2013.01)

(58) Field of Classification Search
CPC ................ G06F 17/289; G06F 17/2854
USPC ........................................ 704/2–8
See application file for complete search history.

(56) References Cited

U.S. PATENT DOCUMENTS

| 2007/0294076 | A1* | 12/2007 | Shore | G06F 17/2836 704/2 |
| 2012/0136648 | A1* | 5/2012 | Elliot | G06F 17/28 704/2 |
| 2013/0144594 | A1* | 6/2013 | Bangalore | G06F 17/2836 704/2 |
| 2015/0302005 | A1* | 10/2015 | Wu | G06F 17/2735 704/2 |
| 2016/0019816 | A1* | 1/2016 | Parry | G09B 19/06 704/2 |
| 2016/0085746 | A1* | 3/2016 | Ni | G06F 17/289 704/2 |
| 2016/0188576 | A1* | 6/2016 | Huang | G06F 17/2854 704/2 |

* cited by examiner

*Primary Examiner* — Shaun Roberts
(74) *Attorney, Agent, or Firm* — Fenwick & West LLP

(57) ABSTRACT

An adaptive localization system translates and displays translated content to a user, for example through a website or application using the adaptive localization system. A user can view, receive, or otherwise interact with the translated content, which can be differently translated based on desired language, geographic location, an intended user, or other relevant characteristics of the viewing user. The adaptive localization engine can translate the inherent meaning of content rather than, for example, creating an exact grammatical or "word-for-word" translation of individual words or phrases in the content. The adaptive localization engine displays alternate variations of the same translation of content to different users and based on user response to the alternate translations, determines the accuracy or correctness of a certain translations of content and modifies future translations accordingly.

17 Claims, 5 Drawing Sheets

DYNAMIC SUGGESTIONS FOR CONTENT TRANSLATION

CROSS REFERENCE TO RELATED APPLICATIONS

This application claims benefit of provisional U.S. Application No. 62/308,681, filed Mar. 15, 2016, which is incorporated herein by reference in its entirety.

BACKGROUND

This disclosure relates to translating content for display to a user. Translation is needed in many contexts, for example translations of applications, websites, and other digital content intended to be used in multiple countries or region. In order to be understandable in another language or region the content may need to be translated into another language, and word choice or layout may need to be adjusted to adapt the content for another region, even if the contextual meaning of the content remains the same.

Manual translation methods can be slow and prohibitively expensive to translate or localize content into many contexts; therefore current content translation methods may use statistical translation methods to generate translations for display. However, current statistical translation methods focus on generating grammatically correct or "word-for-word" translations which can lose some of the original meaning of the content. For example, a word-for-word translation can miss nuances in word choice or phrasing needed to preserve the original meaning of the content. Therefore there is need for a less grammar-based translation method better able to capture the underlying meaning of content in translations.

SUMMARY

An adaptive localization system translates (or localizes) and displays translated content to a user, for example through a website or application using the adaptive localization system. A user can view, receive, or otherwise interact with the translated content, which can be differently translated based on a desired language, geographic location, intended user, or other relevant characteristics of the situation (or user) in which the content is viewed. The adaptive localization engine can translate the inherent meaning of content rather than, for example, creating an exact grammatical or "word-for-word" translation of individual words or phrases in the content. The adaptive localization engine displays alternate variations of the same translation of content to different users. Based on user response to the alternate translations, the adaptive localization engine can determine the accuracy or correctness of a certain translation of content and can modify future translations accordingly. For example, an adaptive localization engine can display alternate translations of the same content to different users and analyze the results of interactions with each translation to determine the relative efficacy of each translation.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

An adaptive localization engine translates content for display to a user according to some embodiments. In some embodiments, content translated or localized by an adaptive localization engine is provided by a client server associated with a client. A user can view, receive, or otherwise interact with content translated by an adaptive localization engine. Translations received from an adaptive localization engine can be based on language, geographic location, an intended user, or characteristics of the intended user. Thus, as used herein, "translation" refers to the conversion of one language variant to another language variant, which may include different versions or dialects of the same language, such as translation from British English to American English, or a localization from a language used in one region of a country to another region of the same country, even if the same language. The adaptive localization engine can focus on translating the inherent meaning of content rather than, for example, focusing on creating an exact grammatical or "word-for-word" translation of individual words or phrases of the content.

According to some configurations, an adaptive localization engine can display different or alternate translations of the same content to different users. In some implementations, alternate translations are presented to users based on the settings or demographic information of each user. For example, the provided translation can depend on a language setting of a user device used to display the content to the user. Additionally, an adaptive localization engine determines the accuracy or correctness of a certain translation of content, according to some embodiments and can modify future translations based on this information. For example, an adaptive localization engine can display alternate translations of the same content to different users and analyze the results of user interactions with each of the alternate translations to determine the relative efficacy of each alternate translation. Based on the determined relative efficacies, more effective translations can be displayed to users at a greater frequency.

Environment Overview

Figure 1:
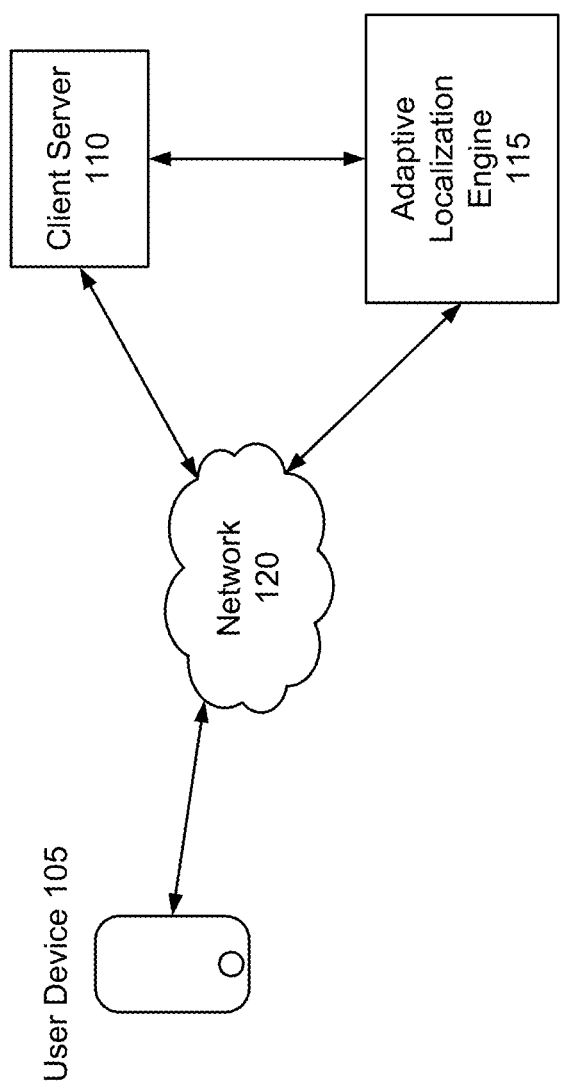
FIG. 1 is a block diagram of an example environment in which an adaptive localization engine operates, according to one embodiment.

FIG. 1 is a block diagram of an example environment in which an adaptive localization engine operates, according to one embodiment. The environment 100 of FIG. 1 includes a user device 105, client server 110, adaptive localization engine 115, and network 120. For clarity, only one user device 105 and client server 110 have been shown in FIG. 1. However, embodiments can include many user devices 105 and client servers 110. The client server 110 provides content for translation by the adaptive localization engine 115 and presentation to the user device 105.

A user device 105 is a device capable of interacting with a client server 110 to retrieve and display content for the user. For example, a user device can be a mobile computing device, laptop or desktop computer, tablet, or other suitable computing device capable of interfacing electronically with a client server 110 and displaying content to the associated user. Each user device 105 is operated by a user and can display content to the user as provided by the client server 110 and translated by the adaptive localization engine 115. In some embodiments, user devices 105 additionally interact with the adaptive localization engine 115, for example to receive translated content for display or to send data regarding interactions of users with translated content. Interactions between user devices 105 and the client server 110 and adaptive localization engine 115 can occur over a network 120 or other suitable communication system. In some embodiments, user devices 105 can provide user-selected settings or other indications of the preferences or demographics of the associated users to the adaptive localization engine 115. For example a user device 105 can include an age, location, or other demographic information about a user. In some embodiments, a user device 105 collects information about interactions between a user operating the user device 105 and a client server 110 or the adaptive localization engine 115 to improve the translations of the adaptive localization engine 115. Collected interaction information can include information about content viewed on the user device 105, a length of time of interactions between the user and the content, or a type of interaction with the content, such as a user's click (or other interaction) on an element in a display or the length of time the user reads the content (i.e., stays on a page displaying the content). Information about these various interactions are provided to the adaptive localization engine 115 to improve selection of translations, as further discussed below.

A client server 110 is a website or other server containing content to be translated, according to some embodiments. A client server 110 can be, for example, a website, application, web application, or other system displaying content that can be translated or localized for a user. Content contained within a client server 110 can be separated into multiple segments each containing a subset of the content within the client server 110 (hereinafter, "content segments") indicating a common topic or function within the client server 110. Content segments can include, for example, text passages, menu items, articles, banners, and multimedia items such as video or audio recordings. Content segments can be predefined by the client server 110, and, in some implementations, are also associated with an indicator of the topic area or concept of a content segment (hereinafter, a domain). For example, "arts," "politics," "travel," and "sports are all possible domains.

In some embodiments, the client server 110 communicates with the adaptive localization engine 115 to receive translated versions of content segments containing content different form the original content of the client server 110 (hereinafter "translated content segments") to be sent to user devices 105 for display. Translated content segments received from the adaptive localization engine 115 can be transmitted by the client server 110 to user devices 105 for display to a user based a language setting of the user device 105, demographic information of the user, or other suitable factors. A client server 110 can also collect data about interactions between users or user devices 105 and content segments (hereinafter "user interaction data"). Interaction data can be a record of a specific interaction including, for example, a time of the interaction and a type of the interaction. Interaction data can include statistics compiled over multiple interactions by different users, such as a click through rate or other interaction rate with a content segment. In some implementations, user interaction data collected by a client server 110 is directly received from user devices 105, such as in embodiments where user devices 105 directly gather and report user interaction data to the client server 110. For example, the client server 110 can receive direct feedback from user devices 105 or users about the accuracy of translation or efficacy of content segments. In other embodiments, the client server 110 can also obtain interaction data by analyzing the behavior of user devices 105 when interacting with content segments. For example, the client server 110 can collect click-through rates for specific content segments utilizing requests for a page from user devices 105.

The adaptive localization engine 115 translates content segments associated with a client server 110. In some embodiments, each content segment associated with a client server 110 is translated, but, in other embodiments, content segments for translation are chosen based properties of each content segment. For example, content segments for translation can be chosen based on receiving a suggested translation from a client server 110 or from a client associated with a client server 110 (hereinafter, a "client suggestion"). Translated content segments can be provided to client server 110 or, in some implementations, provided directly to a user device 105 for display. In some embodiments, the adaptive localization engine 115 is separate from the client server 110 and communication between the adaptive localization engine 115 and the client server 110 occurs over a network 120. However, in other embodiments, the adaptive localization engine 115 can be directly connected to the client server 110 over a direct network or integrated within the client server 110.

In some configurations, content segments are prepared for translation by the adaptive localization engine 115 prior to being translated. For example, a content segment can be prepared for translation by first removing punctuation from the segment, removing detected words indicating the end of a segment (such as mark-up language elements), and other means of normalizing the segment. Content segments translated by the adaptive localization engine 115 (hereinafter "translated content segments") can be translated based on language, dialect, geographic area or region, demographic information of an intended viewer, or any identified language variation. Similarly, translated content segments can be provided to user devices 105 based on any number of suitable factors. For example, translated content segments can be provided to user devices 105 based on a setting of the user device 105, based on a location or geographic region in which the user device 105 is operating or for any other suitable reason. Similarly, the location or geographic region in which the user device 105 is operating may be used to determine the target language and variation for the translation. Additionally, the adaptive localization engine can determine the efficacy of a particular translation of a content segment and to select different translations for the content segment based on the efficacy of the different translations. In some embodiments, the adaptive localization engine 115 also calculates and displays statistics or analytics about interactions between users and content segments. The adaptive localization engine 115 is described further in relation to FIG. 2.

The network 120 can be any combination of local area or wide area networks, and can be composed of wired, wireless, or any combination of wired or wireless networks. In some implementations, the network 120 uses standard communication protocols such as hypertext transport protocol (HTTP) or transmission control protocol/Internet protocol (TCP/IP). The network 120 can use technologies such as Ethernet, 4G LTE, or a digital subscriber line (DSL). In some implementations, encrypted data can be transmitted over the network 120.

Adaptive Localization

Figure 2:
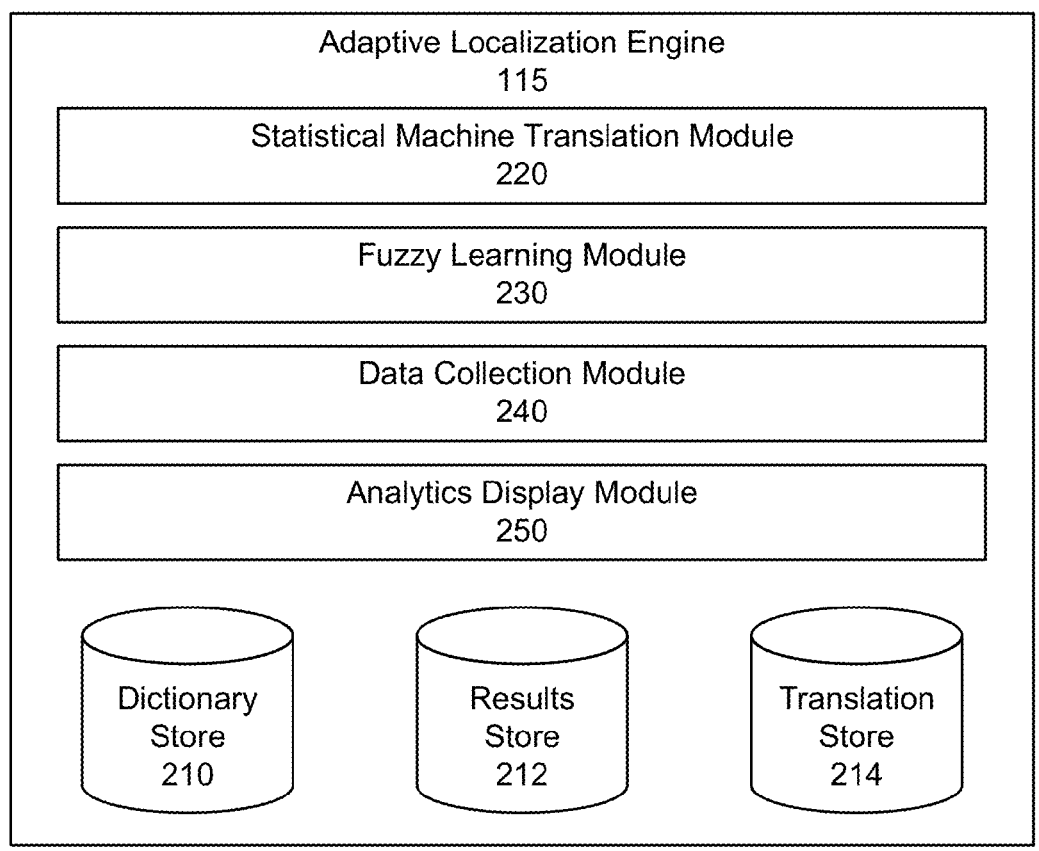
FIG. 2 is a block diagram of an example adaptive localization engine, according to one embodiment.

FIG. 2 is a block diagram of an example adaptive localization engine 115, according to one embodiment. The adaptive localization engine 115 of FIG. 2 includes a dictionary store 210, results store 212, translation store 214, statistical machine translation module 220, fuzzy learning module 230, data collection module 240, and analytics display module 250. However, in other embodiments, the adaptive localization engine contains additional modules to perform the functions of one module shown in FIG. 2, and/or the functions of multiple modules can be combined into a single module. As discussed earlier, the adaptive localization engine 115 translates content segments associated with a client server 110.

The dictionary store 210 can store definitions or translations of words or phrases, according to some embodiments. Definitions or translations stored within the dictionary store 210 can include words or phrases for translations in multiple languages, dialects, or domains. For example, a definition stored in the dictionary store 210 can include a phrase in English, a phrase in French, and a phrase in Chinese all conveying the same meaning or idea. In other embodiments, definitions stored in the dictionary store 210 correspond to modifications of words or phrases in the same language or dialect, for example, a definition instructing replacement of the word "hello" with "hi" in translated content segments. Definitions stored in the dictionary store 210 can each be associated with one or more domains indicating a topic area of the associated definition. For example, a definition can indicate that the phrase "home run" can be substituted for the phrase "good job" in content segments with a domain of "sports," or "baseball." In addition, individual words or phrases may be associated with more than one translation in a target language, each of which may be a viable translation.

In the embodiment of FIG. 2, the results store 212 stores user interaction data and client suggestions indicating responses to translations or localization made by the adaptive localization engine 115. As noted earlier, user interaction data can include, for example, a record of interaction, or click through rate. Client suggestions can include suggested translations of certain content segments, words, or phrases. In some embodiments, client suggestions are provided to the adaptive localization engine 115 by a client server 110.

The translation store 214, according to some embodiments, stores content segments and translated content segments. In some embodiments, the translation store 214 groups or associates content segments or translated content segments related to the same content (hereinafter a "translation option"). Translation options stored within the translation store 214 can each correspond to a specific original content segment, such as a content segment the translation option was translated from, a language such as the current language of the content segment, and a domain indicating a topic area of the content segment.

The statistical machine translation module 220 provides baseline translations of a content segment, according to some embodiments. In some implementations, the statistical machine translation module 220 includes multiple statistical machine translation systems, each configured to translate content associated with a specific domain and. For example, the statistical machine translation module 220 can include statistical machine translation systems associated with domains of "art," "sports," "politics," and other suitable domains. Baseline translations are translations of a content segment generated based on statistical machine translation methods. The statistical machine translation module 220 is trained on a set of terms and translations, which may include sentences and other multiple-word phrases to provide a statistical translation of an unknown sentence or phrase. In some embodiments, baseline translations additionally include client suggestions or other translations received by the adaptive localization engine 115. Baseline translations can be associated with a specific language and specific domain. For example, a baseline translation of a basketball article into Japanese can have an associated language of "Japanese" and an associated domain of "sports." In some embodiments, baseline translations are further augmented or modified before being displayed to users. The statistical machine translation module 220 can output a single baseline translation or a list of baseline translations for a given content segment. For example, the statistical machine translation module 220 can return a baseline translation for each domain of the set of domains and languages. In some implementations, the statistical machine translation module can return multiple baseline translations for a single domain and language, for example returning the baseline translations "hi," "hello," "what's up," and "good morning" for the content of a greeting. In some implementations, a returned list of baseline translations is ordered based on likely accuracy by the statistical machine translations module 220.

In some embodiments, statistical machine translation systems in the statistical machine translation module are retrained periodically to incorporate new data into the statistical machine translation system. For example, in some embodiments statistical machine translation systems are retrained based on data stored in the dictionary store 210.

In the embodiment of FIG. 2, the fuzzy learning module 230 uses machine learning techniques to generate, select, and weight translation options for presentation on user devices 105 for a translation segment. In addition to the list of baseline translations, the fuzzy learning module 230 may also include additional translations as options for the content segment. The additional translations may be based, for example, on user-selected or user-added translations separate from the translations provided by the statistical translation of the statistical machine translations module 220. That is, the translation options may include the baseline translations as well as these additional translations. In some embodiments, translation options also include alternate baseline translations provided by the statistical machine translation module 220, such as a translation associated with a different domain, or a secondary or less optimal translation. Additional translation options can also be generated in some embodiments by combining features of other translation options. In some implementations, translation options selected by the fuzzy learning module 230 are selected from existing baseline or additional translation options stored in the translation store 214 or generated based on existing translation options stored in the translation store 214. Translation options can be selected or generated based on client selection, collected user data such as data collected in the results store 212, or any other suitable factor. For example, translation options can be selected or generated using a gaussian process with optimized hyperparameters.

Translation options can be generated by the fuzzy learning module 230 based on a variety of factors. In some embodiments, additional translation options are generated by augmenting and modifying the baseline translation of a content segment with definitions stored in the dictionary store 210. Additional translation options may also be provided by an operator of the client server 110. Translation options may be used, for example, to provide translations for unique terms or phrases used in the content segment, or to add translations for concepts that may not have existed (or in inadequate samples) when the statistical machine translation module 220 was trained. Such translation options may also be provided by user devices 105 or by a user, according to some embodiments. For example, when a translation option presented to a user has a low confidence value, a user interface element may be presented to the user device 105 giving the user the opportunity to provide an improved translation for the content segment. An alternate translation provided by the user via the user device 105 can then be added as a translation option for the relevant content segment.

The fuzzy learning module 230 applies fuzzy learning techniques to assign weights to each translation option reflecting the likelihood that that translation option is the preferred translation for a content segment. For example, fuzzy learning techniques can assign a weight of 0.9 (or 90%) to translation option A and 0.1 (or 10%) to translation option B. In other embodiments, rather than a weight corresponding to its percentage likelihood, each weight given to a translation option represents an individual score for the translation option, such that the weights for a segment may not equal 1. The fuzzy learning module 230 selects and weighs translation options for a content segment to later be presented on user devices 105, according to some embodiments.

According to some embodiments, multiple translation options are selected for each content segment and each selected translation option is displayed on a subset of user devices 105. User interactions with the different options may be used to affect the future weights assigned to the various translation options. In this way, the adaptive localization engine 115 may increase the likelihood of presenting a translation option that is actually interacted with by users more frequently relative to other translation options, even if initial the weighting of the translation options suggested it was not the best translation option. The weighting of selected translation options for a content segment can correspond to a percentage or likelihood of being displayed or transmitted to a user device 105. For example, translation option A can be assigned a weight of 75%, indicating that it will be displayed to 75% of users accessing that segment. Similarly, translation option B can be assigned a weight of 25%. Weights can be selected based on user interaction data, such as an interaction rate indicating a rate of users interacting with each translation option or click through rate indicating a rate of users clicking on each translation option. In some implementations, the fuzzy learning module 230 continuously updates weights of translation options and selects or modifies translation options based on received client suggestions and collected user interaction data.

Similarly, translation options can be selected for display on a specific user device 105 based on user characteristics associated with that displaying user device 105. For example, translation options can be selected based on desired language, dialect, age of the user, interests of the user, or for any other suitable reason.

In some embodiments, the fuzzy learning module 230 operates based on a language model outlining the grammar and structure of a relevant language. In some embodiments, a language model is a collection of rules and grammars describing the grammar and structure of a specific language. In some implementations, a language model can be generated from a dataset of phrases or sentences of the specific language. For example, a language model can be generated or modified using training data gathered by the adaptive localization engine 115, according to some embodiments.

The data collection module 240 can collect and analyze user interaction data collected from user devices 105 and client servers 110. In some embodiments, the data collection module 240 collects user interaction data related to a specific translation option of a content segment. For example, the data collection module 240 can collect an interaction record associated with a user's interaction with a specific translation option. In some implementations, the data collection module 240 stores collected data in the results store 212.

In some embodiments, definitions are added to the dictionary store 210 based on gathered user interaction data collected by the data collection module 240. For example, interaction data indicating that a particular translation option is very effective in causing users to interact with the content item can result in words or phrases used in that translation option being added to definitions associated with corresponding words or phrases in the original content or in the baseline translation, such as definitions stored in the dictionary store 210.

The analytics display module 250 generates and presents statistics about content segments, according to some embodiments. In some implementations, the analytics display module can display statistics about a content segment across multiple translations of that content segment, such as statistics of a primary translation shown to a majority of users and a variant translation. For example, statistics about a content segment can include a click through or conversion rate of users interacting with that content segment, or a total number of users who have viewed that content segment. The statistics may also display the relative interactions of one translation option compared to another translation option.

Example Implementations of Adaptive Localization

Figure 3:
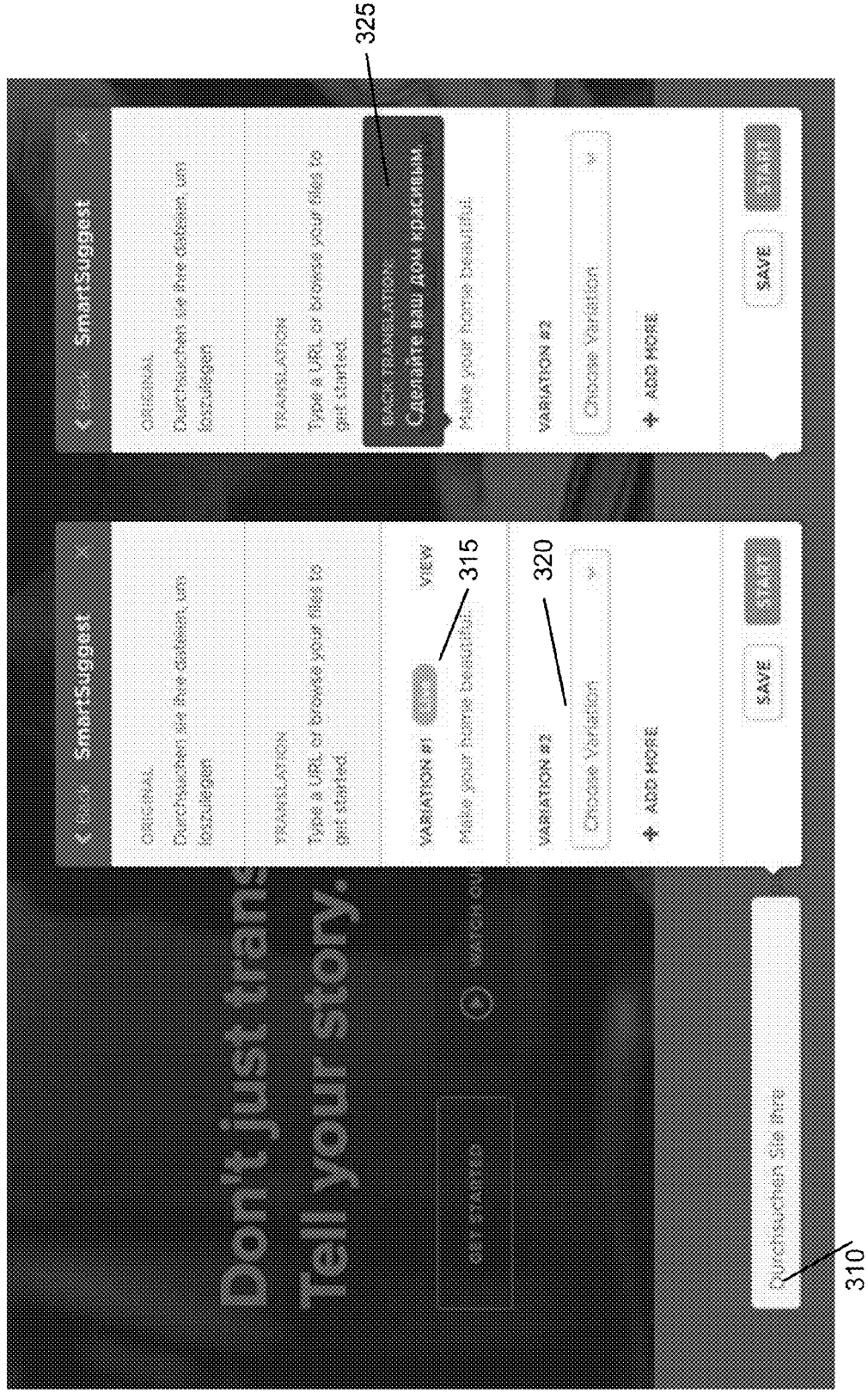
FIG. 3 is an example user interface for adaptive localization, according to one embodiment.

FIG. 3 is an example user interface for adaptive localization, according to one embodiment. User interface 300 shows a content segment 310, a first suggested translation 315, a second selectable translation, 320, and a third generated translation 325. This interface may be shown to an operator of the client server 110 to select a translation option for display. The content segment 310 is a content segment to be translated, in this instance the German phrase "Durchsuchen Sie Ihre." In this implementation, the first suggested translation 315 shows a selected translation option, "Make your home beautiful." The second selectable translation 320 can allow a client to select another translation option, in this case from a drop-down menu. The selected translations from the operator may be used to select a translation for a segment, and may be used to initially weight the selection of translation options. Though shown here as a selection from the operator (i.e., use translation 1), in other examples the user interface permits the operator to view the various translations and relative weighing of each. In addition, the interface may display the frequency that the translation is displayed to user devices 105, and the relative interaction rates with the different translations.

Figure 4:
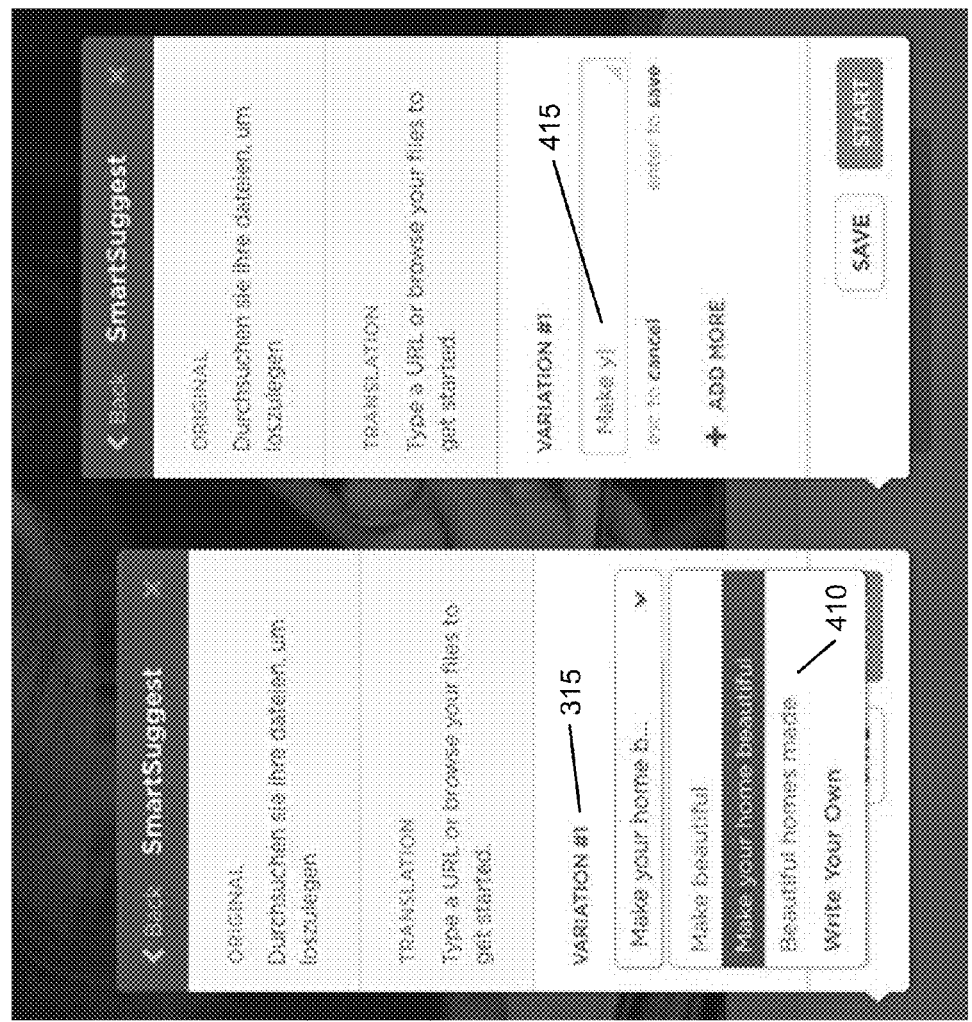
FIG. 4 is another example user interface for adaptive localization, according to one embodiment.

FIG. 4 is another example user interface for adaptive localization, according to one embodiment. User interface 400 shows translation options 410 and a user interface to input an additional translation option 415. The translation options 410 can be selected by a client based on previous suggestions or generated translations by the adaptive localization engine 115. An additional translation option 415 allows a client to input a suggested translation to the adaptive localization engine 115.

Example Process of Adaptive Localization

Figure 5:
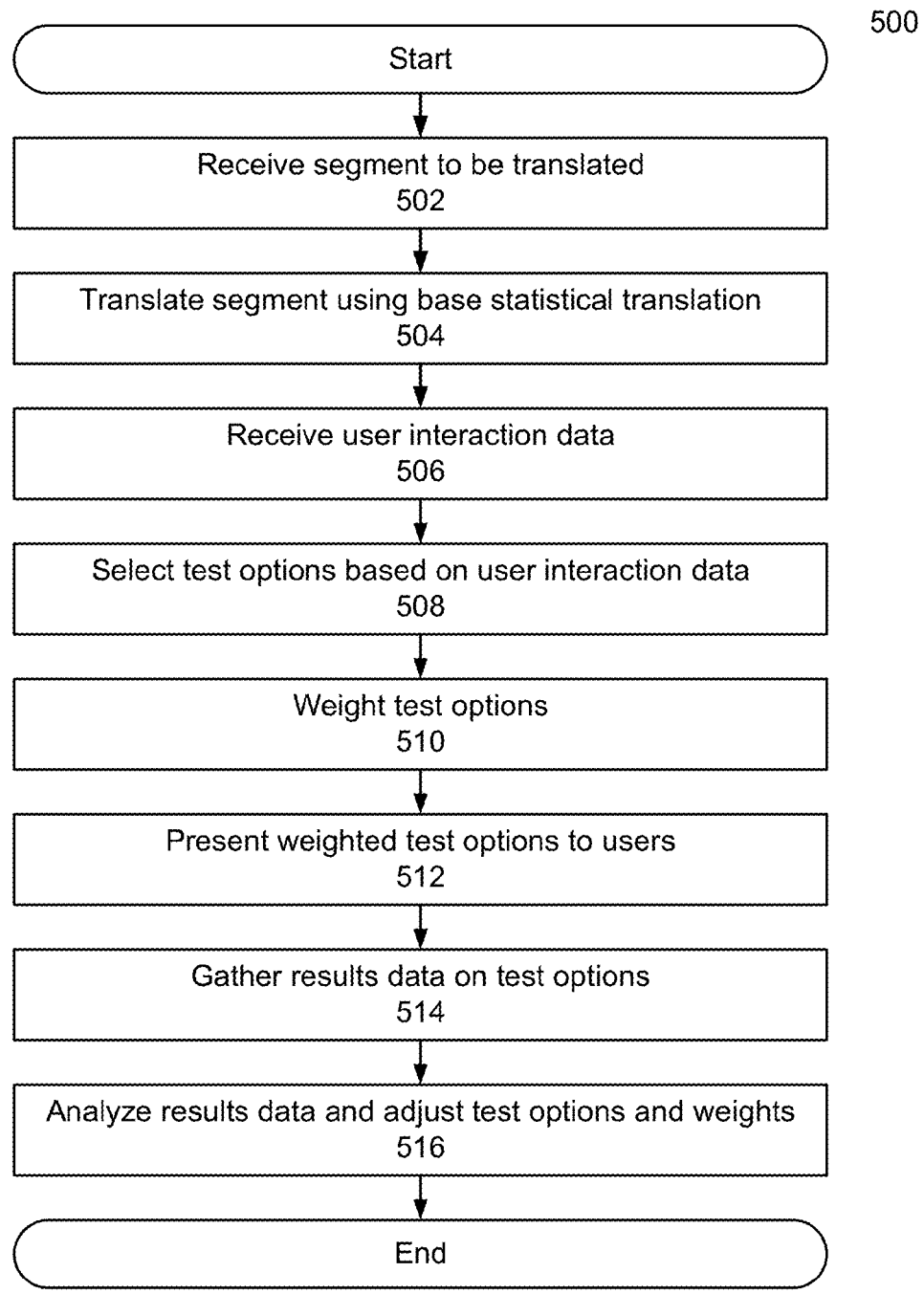
FIG. 5 is an example flowchart of an adaptive localization process, according to one embodiment.

FIG. 5 is an example flowchart of an adaptive localization process, according to one embodiment. Process 500 starts when the adaptive localization system 115 receives 502 a content segment to be translated. In an example embodiment, content segments (or a selection of a content segment) can be received from an application running on a user device 105. The content segment is then translated 504 using statistical machine translation to form one or more base translations for the segment. The adaptive localization system can then receive 506 user interaction data from a client system 110 or a user device 105. The adaptive localization engine 115 can use collected interaction data to select 508 and weigh 510 translation options for the content segment. Translation options are then presented 512 to users and results data on each of the test options is collected 514. For example, translation options can be presented to users of an application running on a user device 105. Then, translation options and weights are adjusted 516 based on analysis of the results data. In some embodiments, the process is repeated continuously and test options and weights are continuously updated.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an adaptive translation engine, a content segment to be translated;
retrieving an original translation of the content segment;
modifying, by a processor, the original translation to form a set of translation options, each translation option of the set of translation options an alternate translation of the content segment based on the original translation;
assigning, to each translation option of the set of translation options, a weight, the assigned weight defining a percentage of a plurality of users the translation option will be displayed to;
for each user of the plurality of users:
selecting a translation option of the set of translation options based on the weight associated with the translation option; and
transmitting for display the selected translation option to the user, wherein each of the set of translation options is transmitted to a subset of the plurality of users based on the weight associated with that translation option;
receiving feedback data from the plurality of users, the feedback data indicating which translation option of the set of translation options was viewed; and
modifying the weight associated with one or more translation options of the set of translation options based on the received feedback data.

2. The method of claim 1, wherein transmitting for display the selected translation option to the user comprises transmitting the translation option to a user device of the user, the user device configured to present the translation option to the user.

3. The method of claim 2, wherein the user device is further configured to collect and transmit user interaction data to the adaptive translation engine and wherein receiving feedback data from the plurality of users comprises receiving user interaction data from the user device.

4. The method of claim 1, wherein transmitting for display the selected translation option to the user comprises transmitting the translation option from the adaptive translation engine to an outside server.

5. The method of claim 4, wherein the outside server is configured to collect feedback data and wherein receiving feedback data from the plurality of users comprises receiving feedback data from the outside server.

6. The method of claim 5, wherein the client server is configured to collect a clickthrough rate for content associated with the translation option.

7. The method of claim 1, wherein the original translation of the content segment comprises a statistical machine translation of the content segment associated with a domain of the content segment.

8. The method of claim 1, wherein assigning a weight to each translation option of the set of translation options comprises using a machine learning model to generate the weight for each translation option of the set of translation options.

9. A non-transitory computer readable storage medium comprising instructions which when executed by a processor cause the processor to perform the steps of:
receiving, at an adaptive translation engine, a content segment to be translated;
retrieving an original translation of the content segment;
modifying, by a processor, the original translation to form a set of translation options, each translation option of the set of translation options an alternate translation of the content segment based on the original translation;
assigning, to each translation option of the set of translation options, a weight, the assigned weight defining a percentage of a plurality of users the translation option will be displayed to;
for each user of the plurality of users:
selecting a translation option of the set of translation options based on the weight associated with the translation option; and
transmitting for display the selected translation option to the user, wherein each of the set of translation options is transmitted to a subset of the plurality of users based on the weight associated with that translation option;
receiving feedback data from the plurality of users, the feedback data indicating which translation option of the set of translation options was viewed; and
modifying the weight associated with one or more translation options of the set of translation options based on the received feedback data.

10. The non-transitory computer readable storage medium of claim 9, wherein transmitting for display the selected translation option to the user comprises transmitting the translation option to a user device of the user, the user device configured to present the translation option to the user.

11. The non-transitory computer readable storage medium of claim 10, wherein the user device is further configured to collect and transmit user interaction data to the adaptive translation engine and wherein receiving feedback data from the plurality of users comprises receiving user interaction data from the user device.

12. The non-transitory computer readable storage medium of claim 9, wherein transmitting for display the selected translation option to the user comprises transmitting the translation option from the adaptive translation engine to an outside server.

13. The non-transitory computer readable storage medium of claim 12, wherein the outside server is configured to collect feedback data and wherein receiving feedback data from the plurality of users comprises receiving feedback data from the outside server.

14. The non-transitory computer readable storage medium of claim 13, wherein the client server is configured to collect a clickthrough rate for content associated with the translation option.

15. A system comprising:
an adaptive translation engine configured to:
receive, at the adaptive translation engine, a content segment to be translated;
retrieve an original translation of the content segment;
modify, by a processor of the adaptive translation engine, the original translation to form a set of translation options, each translation option of the set of translation options an alternate translation of the content segment based on the original translation;
assign, to each translation option of the set of translation options, a weight, the assigned weight defining a percentage of a plurality of users the translation option will be displayed to; and
for each user of the plurality of users:
select a translation option of the set of translation options based on the weight associated with the translation option; and
transmit, to an outside server, the selected translation option for display to the user, wherein each of the set of translation options is transmitted to a subset of the plurality of users based on the weight associated with that translation option;
the outside server configured to, for one or more users of the plurality of users:
receive, from the adaptive translation engine, the selected translation option associated with the user; and
transmit the translation option to a user device associated with the user;
the user device configured to:
receive, from the outside server, a translation option; and
present the translation option to a user of the user device; and
wherein the adaptive translation engine is further configured to:
receive feedback data from the plurality of users, the feedback data indicating which translation option of the set of translation options was viewed; and
modify the weight associated with one or more translation options of the set of translation options based on the received feedback data.

16. The system of claim 15, wherein the user device is further configured to collect and transmit user interaction data to the adaptive translation engine and wherein receiving feedback data from the plurality of users comprises receiving user interaction data from the user device.

17. The system of claim 15, wherein the outside server is configured to collect feedback data and wherein receiving feedback data from the plurality of users comprises receiving feedback data from the outside server.

* * * * *